United States Patent Office 2,801,797
Patented Aug. 6, 1957

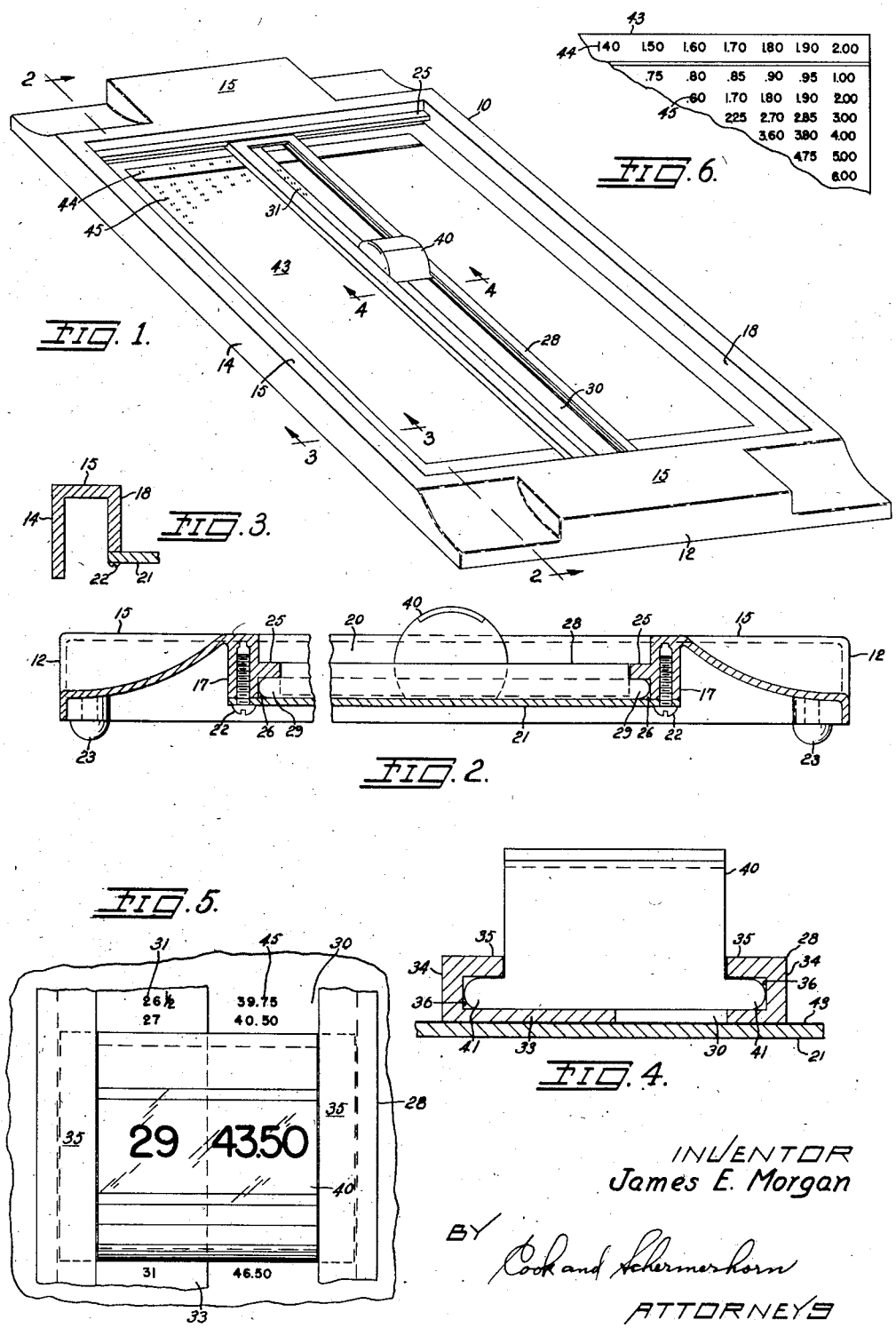

2,801,797

COMPUTING DEVICE

James E. Morgan, Salem, Oreg.

Application February 9, 1953, Serial No. 335,927

2 Claims. (Cl. 235—89)

This invention relates to improvements in devices for computing wages, interest, prices, and the like.

The present invention provides means by which computations may be made of wages, interest, prices, and the like, and is shown and described herein as a wage computer. In general, the invention comprises a rectangular frame member adapted to carry replaceable computation sheets or charts in place for ready reference. Slidably mounted for transverse movement of the frame is a slide member having a column of figures thereon representing consecutively increasing values of elements which contribute to produce the product of the computation. Such may be, for example, the number of hours in a working period, such as a day, week, or month. The slide is provided with a longitudinal slot, and a magnifying device or lens is slidably mounted for movement longitudinally of said slide and is of sufficient width that it bridges the slot and lies over the column of figures on the slide.

The computation sheet has printed thereon an uppermost horizontal row of figures representing the hourly wage scale, and a plurality of vertical columns of figures which represent products of the hourly wage scale and the number of hours worked. The sheet lies beneath the movable slide, and, after the slide has been moved to a predetermined position over the sheet so that a selected wage scale appears in the slot of the slide, the magnifying device or lens is moved longitudinally of the slide until the number of hours worked appears thereunder, the product desired also appearing under the lens adjacent the number of hours worked. In order that the dimension of the device may be kept within reasonable limits and yet enable the tabulation of sufficient information on the computation sheets to make the device of practical value, the figures on the computation sheets may be of small point type and not easily discernible by an unaided eye. Likewise, figures in the column of figures which parallels the slot in the slide may be of greatly reduced size, corresponding in legibility with the figures on the computation sheet. The magnifying lens is moved into position over the selected figures to bring these elements of the computation into outstanding prominence.

It is an object of the invention to provide a device to facilitate the computation of mathematical products, such device having provision for interchange of charts or computation sheets having columns of figures thereon representing consecutively increasing values of elements which contribute to produce the products of the computation.

It is a further object of the present invention to provide a device for computing mathematical products, which device has slotted means to lie over a selected column of figures printed on a chart or computation sheet carried on said device, and means slidable relative to said column of figures to align horizontally a given figure in a column of figures carried on said slidable means with a given figure on the sheet.

Another object is to provide a magnifying device or lens as said slidable means for lying over and enlarging the image of the figures on the computation sheet and on said slide, so that said figures may be printed in small point type to provide a wide range of computations.

Other objects are to provide a computation device which is simple in construction, economical to manufacture, easy to operate, and one which enables rapid and accurate computation of mathematical products.

The invention will be better understood and additional objects and advantages will become apparent from the following description taken in connection with the accompanying drawings which illustrate a preferred form of the device. It is to be understood, however, that the invention may take other forms, and that all such modifications and variations within the scope of the appended claims, and which will occur to persons skilled in the art, are included in the invention.

In the drawings:

Figure 1 is a perspective view of the computing device;

Figure 2 is a longitudinal sectional view taken on the line 2—2 of Figure 1;

Figure 3 is a sectional view taken on the line 3—3 of Figure 1;

Figure 4 is a view showing a sectional elevation of the slide, and showing the magnifying lens mounted thereon, taken on the line 4—4 of Figure 1;

Figure 5 is a fragmentary top plan view showing the magnifying lens and the enlarged image of figures appearing therethrough; and Figure 6 is a plan view showing a portion of the computation sheet.

Referring to the drawings, the computing device comprises a rectangular frame member 10 which may, for example, be formed from a thermosetting plastic. The device has end walls 12, and side walls 14, molded integrally with the top surface 15. Also integrally molded with the stop surface 15 is an inner frame comprising end walls 17, Figure 2, and inner walls 18, Figure 3, which extend downwardly but terminate short of the bottom edge of the end walls 12 and side walls 14. The top surface 15 has a recess 20 centrally of the inner walls as best seen in Figure 2, and a plate 21 is secured to the bottom edges of the inner frame member by means of screws 22 which are threaded vertically in the walls, said plate providing the bottom wall for the recess. Rubber feet 23 are mounted in each corner of the device for supporting the device off the surface of a desk and the like.

The two end walls 17 of the inner frame member are each provided with a flange 25 extending inwardly into the recess 20, and, as seen in Figure 2, a groove 26 is formed between each of said flanges and the bottom wall 21 and extends transversely of the device. A slide member 28 extends from end to end of the inner frame member and is equipped with tongues 29 extending endwise of the slide and slidably engaging the grooves 26 so that the slide can be moved transversely of the frame 10 and over the bottom wall 21.

As seen in cross section in Figure 4, the slide 28 is of relatively narrow construction and comprises a bottom wall 33, side walls 34, and inwardly extending flanges 35 which, together with the side walls 34 and bottom wall 33, form inwardly facing grooves 36 extending longitudinally of the slide. The bottom wall 33 of the slide is provided with an opening 30 extending substantially from end to end of the slide 28 and lying adjacent one of the side walls 34. This opening or slot is of sufficient width to expose one of the vertical columns of figures on the chart or computation sheet, the unslotted portion of the bottom 33 serving to cover or obscure adjacent columns of figures. On the upper surface of the bottom wall 33 adjacent to and parallel with the slot 30 is a column of figures 31, Figure 5, the figures in this column being aligned with the figures in the columns on the computation chart. The figures in column 31 may represent the hours in a work week or other named work period. The column 31 contains each whole number of hours in the work week and half numbers, or, as desired, any other fractions of an hour for which wages are to be computed, and may begin at the top, for example, with the numeral "½." These numerals are equally vertically spaced from each other on the slide and are preferably printed or stamped on a strip of paper which is removable from the slide so that strips having different series of figures thereon may be substituted as desired. In other embodiments of the invention, the column of figures 31 may represent consecutively increasing values of any elements which contribute to produce the product of the computation.

A magnifying device or lens 40 has side tongues 41 which engage in the grooves 36 and hold the magnifying lens in the slide for longitudinal movement therealong. The lens 40 lies over the column of figures 31 on the slide and also bridges the longitudinal slot 30 in the slide.

A computation sheet 43 used with the device is placed in the recess 20 on the top surface of bottom plate 21, a portion of the sheet being shown in Figure 6. The sheet 43 has adjacent its top edge a horizontal row of figures 44 which may designate, for example, an hourly wage scale. Although not shown on the drawings, overtime scales may be provided between the wage scales shown to compute overtime at an increased amount. The figures in row 44 may begin with any desired wage scale. The example shown in Figure 6 includes succeeding scales up to $2.00 per hour, these scales being merely representative and could, of course, list other rates of wages per hour. Printed vertically below each of the wage scales in the row 44 are columns 45 of computations comprising products of the wage scale as listed in the row 44 and the number of hours worked as listed in the column 31 on the slide. The figures in the vertical columns 45 are horizontally aligned in rows across the sheet, and are equally spaced vertically to conform with the vertical spacing of the figures in the column 31 on the slide. The figures comprising the hourly wage scales in row 44 and the numerals comprising the computations in the columns 45 are printed, photographed, or otherwise provided on the sheet 43 and are of a reduced size so that a wide range of computations may be presented on a single sheet 43. The images of these figures are enlarged when appearing under the lens 40 and are then clearly legible.

To compute a worker's pay for a given number of hours employed, the magnifying lens is first moved to its uppermost position on the slide to magnify the figures appearing thereunder in the row 44. The slide is then moved transversely of the frame 10 until the established wage scale appears in the slot 30 of the slide and under the magnifying lens. Having located the proper wage scale, the magnifying lens 40 is merely moved longitudinally of the slide to a position in which the number of hours worked appears in the column 31 therebeneath. The number on the computation sheet 43 appearing under the lens 40 to the right of the predetermined hours worked is the total pay. As shown in Figure 5, a worker's pay has been computed for 29 hours at a wage scale of $1.50 per hour. The slide has been positioned so that the wage scale of $1.50 appears in the upper portion of the slot and the magnifying lens moved on the slide to be over the numeral "29" which designates the number of hours worked. Also appearing under the magnifying lens to the right of the numeral 29 is the total amount of wages, $43.50.

Many types of computation sheets may be used with the present device, and it is of special advantage that the computations on the sheet, as well as the figures printed on the slide are printed in small type so that a wide range of computations may be accomplished. The image of the numerals is greatly enlarged by the magnifying lens, and such a structure permits a computation sheet to be used which has a great number of figures thereon. The invention provides that the image of the numerals used in each computation is enlarged to obviate the making of errors. To replace the sheet 43 with another sheet having different wage scales, or if the device is to be used for an entirely different computation, the sheet can be removed from under the slide and a new sheet inserted. If desired, the screws 22 may be removed and the bottom plate 21 and the whole slide assembly removed from the bottom of the frame, whereupon the slide may be lifted from the plate 21 to facilitate mounting a new sheet on the plate.

Having now described my invention and in what manner the same may be used, what I claim as new and desire to protect by Letters Patent is:

1. A computing device comprising a base frame for carrying a computation sheet, said sheet having an upper horizontal row of figures and vertical columns of figures under each of the figures in said horizontal row, a slide movable on said base frame and over said sheet, a slot extending longitudinally of said slide to expose a single column of figures on said sheet, a plurality of figures on said slide, said figures being arranged in a column parallel to said slot, the figures in said several columns being of small point type to provide for the maximum number of columns and figures on a single sheet, and a magnifying lens slidably mounted on said slide for longitudinal movement relative thereto and of a width transversely to overlie said slot and said column of figures on said slide to enlarge the image of figures appearing thereunder in both of said columns.

2. A computing device comprising a frame, a recess in said frame having end walls, side walls and a removable plate forming the bottom of said recess, said plate providing support for a computation sheet having vertical columns of figures, the end walls of said recess provided with transversely extending guide means, a relatively narrow slide member extending from end to end of said recess and slidably engaging said guide means, said slide member being movable transversely of said recess over said plate and a sheet supported thereby, said slide member comprising a pair of spaced longitudinal frame members and a bottom wall, an opening in said bottom wall extending substantially from end to end of the slide, said opening being of a width to expose a single column of figures on said sheet, the bottom wall masking adjacent columns of figures, a column of figures on said bottom wall adjacent to and parallel with said opening, and a magnifying lens slidably mounted in said frame members for movement longitudinally of said slide and of a width to overlie said opening and the column of figures on said bottom wall.

References Cited in the file of this patent

UNITED STATES PATENTS

| | | |
|---|---|---|
| 510,319 | Blair et al. | Dec. 5, 1893 |
| 767,087 | Speckman | Aug. 9, 1904 |
| 996,039 | Keuffel | June 20, 1911 |
| 1,209,878 | Oliver | Dec. 26, 1916 |
| 1,608,409 | Madison | Nov. 23, 1926 |
| 2,415,581 | Doub | Feb. 11, 1947 |
| 2,533,628 | Rosenberg | Dec. 12, 1950 |

FOREIGN PATENTS

| | | |
|---|---|---|
| 247,543 | Great Britain | Jan. 25, 1926 |